(12) United States Patent
Bayley et al.

(10) Patent No.: US 6,696,166 B2
(45) Date of Patent: *Feb. 24, 2004

(54) PLASTIC FILMS

(75) Inventors: John Bayley, Calgary (CA); Peter Andrew Sipos, Calgary (CA); Nakul Ulhas Ranade, Calgary (CA)

(73) Assignee: Nova Chemicals (International) S.A. (CH)

( * ) Notice: Subject to any disclaimer, the term of this patent is extended or adjusted under 35 U.S.C. 154(b) by 44 days.

This patent is subject to a terminal disclaimer.

(21) Appl. No.: 10/114,152

(22) Filed: Apr. 2, 2002

(65) Prior Publication Data

US 2003/0017354 A1 Jan. 23, 2003

(51) Int. Cl.⁷ ............................................. B32B 27/32
(52) U.S. Cl. ...................... 428/523; 428/516; 428/910; 526/348.1
(58) Field of Search ................................. 428/516, 523, 428/910; 526/348.1

(56) References Cited

U.S. PATENT DOCUMENTS 6,340,532 B1 * 1/2002 Huang et al. ............... 428/523

* cited by examiner

*Primary Examiner*—D. S. Nakarani
(74) *Attorney, Agent, or Firm*—Kenneth H. Johnson

(57) ABSTRACT

A plastic film having a desirable balance of physical properties is prepared using a pseudohomogeneous linear low density polyethylene (lldpe) resin on a blown film extrusion line. The lldpe used in this invention must have a melt index, $I_2$, of from 0.4 to 0.8 grams per 10 minutes, a base resin density of from 0.915 to 0.919 grams per cubic centimeter and a copolymer/homopolymer (COHO) ratio of from 3 to 9. The film must be prepared under specific extrusion conditions using a specific annular extrusion die. The film of this invention has a dart impact strength of greater than 600 grams per mil and a machine direction tear strength of greater than 350 grams per mil and is suitable for the preparation of packaging and trash bags.

5 Claims, No Drawings

PLASTIC FILMS

FIELD OF THE INVENTION

This invention relates to plastic films prepared from pseudohomogeneous linear low density polyethylene resin in a blown film process.

BACKGROUND OF THE INVENTION

The extrusion-blown film process is a well known process for the preparation of plastic film. The process employs an extruder which heats, melts and conveys the molten plastic and forces it through an annular die.

The polyethylene film is drawn from the die and formed into a tube shape and eventually passed through a pair of draw or nip rollers. Internal compressed air is then introduced from the mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed into two doubled layers of film immediately after passing through the draw or nip rolls. The cooled film can then be processed further by cutting or sealing to produce a variety of consumer products. Whilst not wishing to be bound by theory, it is generally believed by those skilled in the art of manufacturing blown films that the physical properties of the finished films are influenced by both the molecular structure of the lldpe and by the processing conditions. For example, the processing conditions are thought to influence the degree of molecular orientation (in both the machine direction and the axial or cross direction).

A balance of cross and machine direction molecular orientation is generally considered most desirable for key toughness properties associated with the invention (i.e. Dart Impact strength and Machine Direction or "Elmendorf" tear properties).

Thus, it is recognized that these stretching forces on the "bubble" have an affect on the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane or 2) a lamination process in which film layers are laminated together.

It is also well known that the use of different types of plastic can alter the properties of the finished film. This is true even when different grades of the same plastic family are used to prepare the resin. For example, linear low density polyethylene ("lldpe") is widely used to prepare plastic film—and it is known that "homogeneous" lldpe typically produces finished films which have significantly different properties than those obtained with "heterogeneous" lldpe. More particularly, it is now well known that a "homogeneous" lldpe (which lldpe may be produced in the manner disclosed by Elston in U.S. Pat. No. 3,645,992, or by the use of a metallocene catalyst) will typically produce a plastic film with excellent "dart impact strength" in comparison to a plastic film which is manufactured with a "heterogeneous" lldpe (which lldpe may be produced with a conventional "Ziegler-Natta" catalyst). However, it is also known that the "heterogeneous" lldpe will normally provide films with much superior "machine direction tear strength" than films made from homogeneous resins.

It is clearly desirable to produce film having a combination of good impact strength and good machine direction tear strength. One way of doing this is to use a blend of "homogeneous" lldpe and "heterogeneous" lldpe, as disclosed in U.S. Pat. No. 6,111,023 (Chum et al., to Dow). Films produced from such blends do have a very good balance of dart impact strength and tear strength properties. However, the films are comparatively expensive to produce due to the high cost of the homogeneous resin and due to the need to carefully prepare the blends of resins. Thus, for reasons of reduced cost and increased convenience, it would be preferable to produce films having a balance of enhanced impact strength and enhanced tear strength using a single type of lldpe resin.

SUMMARY OF THE INVENTION

This invention relates to a monolayer thermoplastic film having a dart impact strength of greater than 600 grams per mil as determined by ASTM D1709 and a machine direction tear strength of greater than 350 grams per mil wherein said film is prepared by a blown film extrusion process using a linear low density polyethylene resin having 1) a melt index as determined by ASTM D1238, condition $I_2$, of from 0.4 to 0.8 g/10 min; 2) a base resin density of from 0.915 to 0.919 grams per cubic centimeter; a COHO ratio of from 3 to 9; and wherein said blown film extrusion process uses an annular extrusion ring having a die gap from 35 to 120 mils and a blow up ratio ranging from 2 to 4.

The plastic film of this invention is suitable for use in a monolayer in such applications as trash bags and packaging. It is also within the scope of this invention to prepare multilayer films using the film of this invention as one of the layers.

DETAILED DESCRIPTION

The film of this invention has a highly desirable combination of excellent dart impact strength (greater than 600 grams per mil, as determined by ASTM D1709) and excellent machine direction tear strength (greater than 350 grams per mil, as determined by ASTM D9922). Applicants are unaware of any prior monolayer lldpe film having this highly desirable balance of properties.

The film is produced by an extrusion-blown process. The extrusion-blown process, and the machinery used in the process, are well known to those skilled in the art and is widely described in the literature. However, the film of this invention must be produced according to the following conditions:

1) the die gap of the annular die used to extrude the molten bubble must be from 35 to 120 mils; and
2) the blow up ratio must be from 2 to 4.

The catalyst used to prepare the lldpe resin of this invention is a high efficiency magnesium titanium type of Ziegler Natta catalyst. The catalyst must contain a titanium compound. Exemplary titanium compounds include titanium halides (especially titanium chlorides, of which TiCl$_4$ is preferred); titanium alkyls; titanium alkoxides (which may be prepared by reacting a titanium alkyl with an alcohol) and "mixed ligand" compounds (i.e. compounds which contain more than one of the above described halide, alkyl and alkoxide ligands.

The catalyst must also contain an organoaluminum component which is defined by the formula:

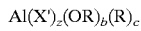

$$Al(X')_a(OR)_b(R)_c$$

wherein: X' is a halide (preferably chlorine); OR is an alkoxy or aryloxy group; R is a hydrocarbyl (preferably an alkyl having from 1 to 10 carbon atoms); and a, b, or c are each 0, 1, 2 or 3 with the provisos text a+b+c=3 and b+c≧1.

The catalyst must also contain a magnesium halide. This may be done by directly adding the component (such as MgCl$_2$) or by adding a magnesium alkyl (such as butyl ethyl magnesium) and a halide source (which is typically a chloride such as tertiary butyl chloride).

The Ziegler Natta catalyst may also be "tempered" (i.e. heat treated) prior to being introduced to the reactor (again, using techniques which are well known to those skilled in the art and published in the literature). Particularly preferred Ziegler Natta catalysts and methods of preparing them are described in U.S. Pat. Nos. 5,492,876; 5,519,098; and 5,589,555.

Solution processes for the copolymerization of ethylene and an alpha olefin having from 3 to 12 carbon atoms are well known in the art. These processes are conducted in the presence of an inert hydrocarbon solvent typically a C$_{5-12}$ hydrocarbon which may be unsubstituted or substituted by a C$_{1-4}$ alkyl group, such as pentane, methyl pentane, hexane, heptane, octane, cyclohexane, methylcyclohexane and hydrogenated naphtha. An example of a suitable solvent which is commercially available is "Isopar E" (C$_{8-12}$ aliphatic solvent, Exxon Chemical Co.).

The solution polymerization process of this invention may use more than one polymerization reactor. If the (optional) second reactor is used, the polymer solution resulting from the first reactor is preferably transferred to the second polymerization (i.e. the reactors are most preferably arranged "in series" so that polymerization in the second reactor occurs in the presence of the polymer solution from the first reactor).

The polymerization in a single reactor may occur at a temperature of from about 100 to about 300° C. In a dual reactor process, the polymerization temperature in the first reactor is from about 80° C. to about 180° C. (preferably from about 120° C. to 160° C.) and the hot reactor is preferably operated at a slightly higher temperature. Cold feed (i.e. chilled solvent and/or monomer) may be added to both reactors or to the first reactor only. The polymerization enthalpy heats the reactor. The polymerization solution that exits the reactor is generally more than 100° C. hotter than the reactor feed temperature. Both reactors must be "stirred reactors" (i.e. the reactors are extremely well mixed with a good agitation system).

The highly efficient Ziegler Natta catalyst which is used in this invention is heterogeneous—i.e. it is not completely soluble in the polymerization system. However, the lldpe resin of this invention is comparatively homogeneous compared to conventional lldpe resins made with Ziegler Natta catalysts (i.e. the relatively homogeneous lldpe resin of this invention has a high COHO ratio, as will be described later in the disclosure). While not wishing to be bound by theory, it is believed that highly efficient polymerization reactor agitation and the use of an efficient Ziegler Natta catalyst enables the preparation of a comparatively homogeneous lldpe resin ("pseudohomogeneous" lldpe resin). Agitation efficiency may be determined by measuring the reactor temperature at several different points. The largest temperature difference (i.e. between the hottest and coldest temperature measurements) is described as the internal temperature gradient for the polymerization reactor. A very well mixed polymerization reactor has a maximum internal temperature gradient of less than 10° C. A particularly preferred agitator system is described in copending and commonly assigned U.S. patent application Ser. No. 09/048,945. Preferred pressures are from about 500 psi to 8,000 psi. The most preferred reaction process is a "medium pressure process", meaning that the pressure in each reactor is preferably less than about 6,000 psi (about 42,000 kiloPascals or kPa), most preferably from about 1,500 psi to 3,000 psi (about 14,000–22,000 kPa)

Suitable monomers for copolymerization with ethylene include C$_{3-12}$ alpha olefins which are unsubstituted or substituted by up to two C$_{1-6}$ alkyl radicals. Illustrative non-limiting examples of such alpha-olefins are one or more of propylene, 1-butene, 1-pentene, 1-hexene, 1-octene and 1-decene. Octene-1 is highly preferred.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing may be desirable to provide a reaction time for the catalyst components prior to entering the reaction. Such an "in line mixing" technique is described the patent literature (most notably U.S. Pat. No. 5,589,555, issued Dec. 31, 1996 to DuPont Canada Inc.).

The residence time in the polymerization reactor(s) will depend on the design and the capacity of the reactor(s). Generally the reactor(s) should be operated under conditions to achieve a thorough mixing of the reactants. When two reactors are employed, it is preferred that from 20 to 60 weight % of the final polymer is polymerized in the first reactor, with the balance being polymerized in the second reactor.

The lldpe resin of this invention must satisfy the following criteria:

1) the melt index (as determined by ASTM D1238, condition I$_2$) must be between 0.4 and 0.8 grams per 10 minutes;
2) the base resin density must be from 0.915 to 0.919 grams per cubic centimeter; and
3) the COHO ratio must be from 3 to 9.

As previously noted, monolayer plastic films according to this invention have a highly desirable balance of dart impact strength and machine direction tear strength (also known as Elmendorff tear strength). In contrast, prior art monolayer films prepared with highly homogeneous lldpe resins (i.e.

lldpe resins having a highly homogeneous comonomer distribution, which may be prepared with a metallocene catalyst) typically exhibit extremely high dart impact strength but poor machine direction tear strength. Conversely, conventional lldpe with a heterogeneous comonomer distribution (which lldpe resins may be prepared with a conventional Ziegler catalyst in a conventional polymerization reactor) typically produce monolayer films having poor dart impact strength but good machine direction tear strength.

Whilst not wishing to be bound by theory, it is believed that the specific lldpe resin used in this invention will provide the film of this invention (when the film is prepared in a blown film extrusion process using the previously specified annular die and blow up ratio) because:

1) the specified melt index corresponds to a comparatively high molecular weight, which is thought to be necessary to provide the strength of the film;

2) the specified density corresponds to a branching frequency within the lldpe resin which is high enough to provide toughness and also low enough (in combination with the specified COHO ratio) to allow the small amount of heterogeneity of comonomer distribution which is thought to be necessary to provide the tear strength;

3) the specified COHO ratio defines an lldpe resin having a distinct (but comparatively low) degree of heterogeneity with respect to comonomer incorporation in the polymer background—and it is believed that this degree of heterogeneity (in combination with the molecular weight and density) is required to produce the films of this invention.

The preferred lldpe resins used in this invention have a COHO ratio of from 4 to 9—i.e. they contain from 80 to 90 weight % copolymer (and, correspondingly to 100 weight %, from 20 to 10 weight % homopolymer). Thus, these preferred lldpe resins contain a high degree of homogeneity and may be referred to as "pseudohomogeneous".

The resin may be compounded with conventional additives such as antioxidants, stabilizers, pigments and/or opacifying agents, process aids, antistatic agents and antiblock agents such as silica or talc. These additives may be used in conventional amounts. It should be noted that the term "base resin density" refers to the density of the resin prior to the addition of these additives. (By way of explanation, the use of silica antiblock in a conventional amount of about 3000 parts per million by weight, may increase the density of the compounded resin by more than 0.01 grams per cubic centimeter in comparison to the "base resin".)

The invention will now be described in further detail with reference to the following Examples.

The first part illustrates the copolymerization of ethylene and octene-1 in a dual polymerization reactor system using a Ziegler Natta catalyst.

The second part illustrates the preparation of the inventive films.

1. Melt Index "$I_2$" was determined according to ASTM D1238. [Note: $I_2$ measurements are made with a 2.16 kg weight.] Test results are reported in grams/10 minutes (though these units are often omitted by convention).

2. Stress Exponent ("$S.E_x$") is calculated by $$\frac{\log(I_6/I_2)}{\log(3)}.$$

3. Number average molecular weight (Mn); weight average molecular weight (Mw) and polydispersity (calculated by Mw/Mn) were determined by Gel Permeation Chromatography "GPC").
4. Flexural Secant Modulus and Flexural Tangent Modulus were determined according to ASTM D882.
5. Elongation and Yield measurements were determined according to ASTM D636.
6. Melt strength is determined using the same "melt indexer" apparatus used in the aforementioned ASTM 1238 test method. The apparatus is loaded with resin and preheated for 6 minutes to 190°±0.2° C. as per ASTM D1238. The total piston load used is 18,400 g (consisting of the piston weight of 100 g and a 18,300 g weight). The polymer is allowed to extrude from the melt indexer die until the piston is at a point with 2 cm from its end point. The extrudate thread is then quickly removed and a timing device (e.g. a stopwatch is activated). The timer is stopped when the extrudate thread falls from the die. The amount of extrudate is then weighed. This procedure is repeated at least 5 times at different distances between 2 cm and 0 cm from the piston travel end point, yielding different extrudate weights and corresponding times. The results are plotted on 2×2 log—log graph paper (weight of extrudate in grams versus time in minutes). The "melt strength" is reported as the value (in grams) at the three minute time as is expressed, for example as 0.15 g/3 min.
7. Tensile measurements were made according to ASTM D-638-89.
8. Tear strength measurements were made according to ASTM D9922.
9. Density was determined using the displacement method according to ASTM D792.
10. Copolymer/homopolymer (COHO) determinations were made using the Temperature Rising Elution Fractionation or "TREF" technique which is well known to those skilled in the art and widely described in the literature. As will be understood by those skilled in the art, the "copolymer" and "homopolymer" fractions of the resin have substantially different melting points. This allows the copolymer and homopolymer fractions to be separated by the Temperature Rising Elution Fractionation (or TREF) technique. The results from this analysis are conventionally expressed as a copolymer/homopolymer (or "COHO") ratio. A COHO ratio of 4 indicates that the resin has four parts by weight of copolymer per part by weight homopolymer (or 80% copolymer). Similarly, a COHO ratio of 19 corresponds to 95 weight % copolymer.

EXAMPLES

Part 1

This example illustrates the continuous flow, solution copolymerization of ethylene and octene at a medium pressure solution polymerization using a highly efficient Ziegler Natta catalyst. A single reactor with a volume of 24 liters and highly efficient agitator was used. Monomers, solvent and catalyst were fed into the reactor as indicated in Table 1. The solvent used in these experiments was methyl pentane. A Ziegler Natta catalyst was used in all experiment catalyst components consisting of titanium tetrachloride (TiCl$_4$), butyl ethyl magnesium (BEM) and tertiary butyl chloride (TBC), with an aluminum activator consisting of triethyl aluminum (TEAL) and diethyl aluminum ethoxide (DEAO). The BEM and TEAL were provided "premixed" (5/1 Mg/Ti mole ratio).

All catalyst components were mixed in the methyl pentane solvent. The mixing order was BEM/TEAL and TBC; followed by $TiCl_4$; followed by DEAO. The catalyst was pumped into the reactor together with the methyl pentane solvent. The catalyst flow rate had an aim point as shown in the table and was adjusted to maintain total ethylene conversions above 80%. Ethylene conversions in each reactor are shown in Table 1 as "QIPS". For example, QIPS of 94% means that 94% of the ethylene was polymerized.

The steady state flow rate of solvent and monomer to reactor 1 ("R1") are shown in Table 1. By way of illustration, the total flow of monomers and solvent for Resin 1 (Dual Reactor) in R1 was 285.65 kg/hr (consisting of 19.92 kg/hr ethylene, 21.19 kg/hr octene, and by difference 244.54 kg/hr of solvent). The temperature of this fresh feed was approximately 30° C.

Table 1 also shows hydrogen flow rates (grams per hour, added as a telomerization agent to control polymer molecular weight) and catalyst concentrations. By way of illustration, the aim point for titanium concentration for Resin 1 (Dual Reactor) in R1 was 3.14 ppm (weight basis); the Mg/Ti ratio was 5.49; the TBC/Mg mole ratio was 2.10; and the Al2/Ti ratio was 1.09 (where Al2 refers to moles aluminum provided by the DEAO).

The entries in Table 1 are a measure of the internal temperature gradient within the polymerization reactor. A pair of thermocouples is located in the reactor with one thermocouple being located in the top third of the reactor and the second being located in the bottom third. The temperature difference (or delta, or "Δ") between these thermocouples is shown in Table 1. For example, ΔTR (the temperature difference between the two thermocouples in reactor 1) was −0.41° C. for Resin 1 (Dual Reactor) in R1.

TABLE 1

| | Polymerization Conditions | | | | | |
| --- | --- | --- | --- | --- | --- | --- |
| | Dual Reactor | | Single Reactor | | | |
| Product | Resin 1 | Resin 2 | Resin 3 | Resin 4 | Resin 5 | Resin 6 |
| TSR (kg/hr) | 863.48 | 891.55 | 666.16 | 687.51 | 685.55 | 665.61 |
| Polymer Production Rate | 112.72 | 112.31 | 87.98 | 88.23 | 88.31 | 86.42 |
| QIPS (Ethylene Conversion %) | 91.78 | 94.51 | 94.10 | 96.64 | 96.14 | 94.56 |
| R1 | | | | | | |
| Total Flow (kg/hr) | 285.65 | 292.36 | 10.34 | 10.34 | 10.34 | 10.34 |
| Ethylene (kg/hr) | 19.92 | 20.00 | — | — | — | — |
| Octene (kg/hr) | 21.19 | 20.02 | — | — | — | — |
| Hydrogen (g/hr) | 0 | 0 | — | — | — | — |
| Temp R1 Inlet (° C.) | 33.83 | 32.69 | — | — | — | — |
| Temp R1 Bottom (° C.) | 148.55 | 144.87 | — | — | — | — |
| Temp R1 (Mean) | 148.14 | 143.69 | — | — | — | — |
| Delta TR1 | −0.41 | −1.18 | — | — | — | — |
| Reactor Pressure (MPa) | 13.55 | 13.49 | 13.31 | 13.51 | 13.39 | 13.06 |
| R2 | | | | | | |
| Total Flow (kg/hr) | 577.83 | 599.19 | 656.16 | 677.51 | 675.55 | 655.61 |
| Ethylene (kg/hr) | 79.86 | 79.92 | 84.97 | 84.99 | 85 | 84.83 |
| Octene (kg/hr) | 31.80 | 30.00 | 50.99 | 50.98 | 49.01 | 49.00 |
| Hydrogen (g/hr) | 0.80 | 0.60 | 0.00 | 0.00 | 0.00 | 0.00 |
| Temp R2 Inlet (° C.) | 31.42 | 30.08 | 30.68 | 30.62 | 30.25 | 32.74 |
| Temp R2 Bottom (° C.) | 173.68 | 169.23 | 174.50 | 169.89 | 171.53 | 175.22 |
| Temp R2 Mean | 182.79 | 179.07 | 184.18 | 181.19 | 181.75 | 183.73 |
| Delta TR2 | 9.11 | 9.84 | 9.68 | 11.30 | 10.22 | 8.51 |
| Reactor Pressure (MPa) | 13.72 | 13.66 | 13.51 | 13.67 | 13.54 | 13.21 |
| R1 Catalyst | | | | | | |
| Ti (ppm) | 3.14 | 3.15 | — | — | — | — |
| Mg/Ti Ratio | 5.49 | 5.49 | — | — | — | — |
| TBC/Mg | 2.10 | 2.10 | — | — | — | — |
| Al2/Ti | 1.44 | 1.44 | — | — | — | — |
| R2 Catalyst | | | | | | |
| Ti (ppm) | 2.29 | 2.19 | 4.10 | 4.10 | 4.10 | 4.10 |
| Mg/Ti Ratio | 6.30 | 6.25 | 5.85 | 5.85 | 5.85 | 5.85 |
| TBC/Mg | 1.90 | 1.90 | 2.10 | 2.10 | 2.10 | 2.10 |
| Al2/Ti | 1.09 | 1.09 | 1.20 | 1.20 | 1.20 | 1.20 |
| Physical Properties | | | | | | |
| Density (g/cc) | 0.9173 | 0.9173 | 0.9181 | 0.9190 | 0.9185 | 0.9187 |
| Melt Index ($I_2$) | 0.64 | 0.50 | 0.55 | 0.62 | 0.53 | 0.49 |
| S. Ex | 1.35 | 1.35 | 1.32 | 1.31 | 1.31 | 1.29 |
| COHO Ratio | 4.7 | 5.6 | 5.1 | 5.5 | 5.3 | 4.3 |

Part 2

This illustrates the preparation of plastic films according to this invention.

Films were prepared a conventional blown film line manufactured by Glouster.

This included A) a single screw extruder having a barrier screw (sold by Brampton Engineering under the tradename Brampton Barrier Screw) with a 2.5" diameter and an L/D of 24:1; and B) a 4" diameter die equipped with a dual lip air ring.

The extrusion conditions used to prepare the samples are given in Table 2.

The lldpe resins were prepared in the manner described in Part 1.

Comparative films were made with two commercially available resins, namely 1) Elite 5400 (an lldpe sold by the Dow Chemical Company having a density of 0.9165 g/cc; a melt index, $I_2$ of 1.03 and a stress exponent of 1.28) and 2) Elite 5100 (an lldpe sold by the Dow Chemical Company having a density of 0.9202 g/cc; a melt index, 12 of 0.87 and a stress exponent of 1.24).

Physical properties of the comparative and inventive films are set out in Table 3.

greater than 350 grams per mil as determined by ASTM D9922 wherein said film is prepared by a blown film extrusion process using a linear low density polyethylene resin having 1) a melt index as determined by ASTM D1238, condition $I_2$, of from 0.4 to 0.8 g/10 min; 2) a base resin density of from 0.915 to 0.919 grams per cubic centimeter; a COHO ratio of from 3 to 9; and wherein said blown film extrusion process uses an annular extrusion ring having a die gap from 35 to 120 mils and a blow up ratio ranging from 2 to 4.

2. The thermoplastic film of claim 1 wherein said linear low density polyethylene is prepared by the copolymerization of ethylene and octene.

3. The thermoplastic film of claim 1 wherein said linear low density polyethylene comprises from 80 to 90 weight % copolymer and, correspondingly to 100 weight %, from 20 to 10 weight % homopolymer.

4. A multilayer thermoplastic film which contains at least one monolayer thermoplastic film according to claim 1.

TABLE 2

Processing Conditions

| Processing Conditions | Benchmark | | Dual Reactor | | Single Reactor | | | |
| --- | --- | --- | --- | --- | --- | --- | --- | --- |
| | Elite 5400 | Elite 5100 | Resin 1 | Resin 2 | Resin 3 | Resin 4 | Resin 5 | Resin 6 |
| Melt Temperature (° F.) | 447 | 450 | 459 | 467 | 452 | 450 | 453 | 456 |
| Frost Line Height (in) | 7 | 7 | 7 | 7 | 7 | 7 | 7 | 7 |
| Die gap (mil) | 35 | 35 | 35 | 35 | 35 | 35 | 35 | 35 |
| BUR | 2.5:1 | 2.5:1 | 2.5:1 | 2.5:1 | 2.5:1 | 2.5:1 | 2.5:1 | 2.5:1 |
| Film Gauge (mil) | 1 | 1 | 1 | 1 | 1 | 1 | 1 | 1 |
| Extruder Current (Amps) | 35.5 | 36.5 | 36 | 37 | 38 | 37 | 38 | 39 |
| Extruder Voltage (Volts) | 131 | 140 | 138 | 142 | 135 | 137 | 140 | 140 |
| Pressure (psi) | 2800 | 3070 | 3150 | 3300 | 3310 | 3240 | 3420 | 3540 |
| Screw Speed (rpm) | 82 | 87 | 87 | 89 | 84 | 86 | 86 | 86 |
| Output (lbs/hr) | 40 | 40 | 41 | 41 | 40 | 40 | 40 | 40 |
| Specific Energy (W/lbs/hr) | 117 | 128 | 121 | 128 | 127 | 120 | 132 | 135 |

TABLE 3

Physical Properties

| | Comparative | | Dual Reactor | | Single Reactor | | | |
| --- | --- | --- | --- | --- | --- | --- | --- | --- |
| | Elite 5400 | Elite 5100 | Resin 1 | Resin 2 | Resin 3 | Resin 4 | Resin 5 | Resin 6 |
| Melt Strength (g/3 min) | 0.16 | 0.21 | 0.38 | 0.40 | 0.333 | 0.321 | 0.396 | 0.388 |
| MFR | 27.7 | 25.1 | 32.9 | 34.3 | 29.78 | 29.45 | 29.97 | 29.30 |
| Dart Impact (g/mil) | 1152 | 1009 | 1358 | 1053 | 1014 | 1025 | 1329 | 1246 |
| Slow Puncture with Teflon-KY (J/mm) | 78 | 56 | 125 | 106 | 107 | 111 | 117 | 125 |
| Tear - MD (g/mil) | 277 | 264 | 366 | 361 | 447 | 450 | 484 | 445 |
| Tear - TD (g/mil) | 502 | 574 | 591 | 668 | 647 | 654 | 704 | 718 |
| Tensile Strength @ Break MD (MPa) | 63 | 57 | 62 | 61 | 59.8 | 57.4 | 68.2 | 65.6 |
| Tensile Strength @ Break TD (MPa) | 52 | 47 | 52 | 52 | 58.8 | 49.2 | 48.6 | 55.3 |
| Tensile Elongation MD (%) | 601 | 600 | 509 | 456 | 473 | 483 | 485 | 470 |
| Tensile Elongation TD (%) | 946 | 924 | 773 | 769 | 828 | 775 | 762 | 797 |
| 1% Sec. Modulus MD (MPa) | 156 | 197 | 177 | 187 | 192 | 201 | 189 | 190 |
| 1% Sec. Modulus TD (MPa) | 157 | 208 | 206 | 215 | 225 | 218 | 227 | 222 |
| External Haze (%) | 7 | 12 | 4 | 4 | 6 | 6 | 6 | 6 |
| Gloss @ 45° | 65 | 51 | 76 | 73 | 66 | 67 | 66 | 66 |
| F HOT TACK (N) | 5.23 | 5.08 | 4.30 | 4.51 | 4.671 | 4.8 | 4.972 | 5.236 |
| F HOT TACK - SIT @ 0.5 N (° C.) | 81 | 90 | 68 | 72 | 86 | 86 | 81 | 85 |
| F HOT TACK - SIT @ 1.0 N (° C.) | 83 | 92 | 74 | 79 | 90 | 91 | 90 | 89.5 |
| Seal Temp. @ Max. Seal Strength (° C.) | 115 | 115 | 115 | 115 | 115 | 120 | 115 | 120 |
| Thickness (mil) | 1 | 1 | 0.94 | 1.08 | 1 | 1 | 1 | 1 |

What is claimed is:

1. A monolayer thermoplastic film having a dart impact strength of greater than 600 grams per mil as determined by ASTM D1709 and a machine direction tear strength of 5. A multilayer thermoplastic film according to claim 4 which is prepared by a coextrusion or lamination process.

* * * * *